United States Patent
Andou

(10) Patent No.: US 9,026,778 B2
(45) Date of Patent: May 5, 2015

(54) INFORMATION PROCESSING APPARATUS AND OPERATION CONTROL METHOD

(75) Inventor: Hideaki Andou, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 515 days.

(21) Appl. No.: 13/413,489

(22) Filed: Mar. 6, 2012

(65) Prior Publication Data

US 2013/0007429 A1 Jan. 3, 2013

(30) Foreign Application Priority Data

Jun. 29, 2011 (JP) ................................. 2011-144869

(51) Int. Cl.
*G06F 1/32* (2006.01)
*G06F 1/24* (2006.01)

(52) U.S. Cl.
CPC .................................... *G06F 1/3203* (2013.01)

(58) Field of Classification Search
CPC ... G06F 9/44526; G06F 9/44508; G06F 8/65; G06F 9/44502; G06F 15/7867; G06F 1/3202; G06F 1/26; G06F 1/266; G06F 1/206; G06F 1/3231; G06F 1/3289; G06F 1/3228; H04L 12/10; H04L 12/12
USPC .................................. 713/100, 300, 310, 320
See application file for complete search history.

(56) References Cited

U.S. PATENT DOCUMENTS

| | | | | |
|---|---|---|---|---|
| 5,692,204 A * | 11/1997 | Rawson et al. | ................ | 713/340 |
| 6,574,740 B1 * | 6/2003 | Odaohhara et al. | ............ | 713/323 |
| 6,785,827 B2 * | 8/2004 | Layton et al. | ................ | 713/300 |
| 7,305,569 B2 * | 12/2007 | Reilly | ............................ | 713/300 |
| 7,437,576 B2 | 10/2008 | Makiyama et al. | | |
| 7,782,333 B2 | 8/2010 | Yamaguchi et al. | | |
| 8,230,245 B2 * | 7/2012 | Khatri et al. | .................. | 713/320 |
| 2002/0178387 A1 * | 11/2002 | Theron | ...................... | 713/300 |
| 2005/0289366 A1 * | 12/2005 | Reilly | ........................... | 713/300 |
| 2007/0255967 A1 * | 11/2007 | Jun | ............................... | 713/300 |
| 2007/0260901 A1 * | 11/2007 | Berenbaum et al. | .......... | 713/300 |

(Continued)

FOREIGN PATENT DOCUMENTS

| | | |
|---|---|---|
| JP | 2004185039 | 7/2004 |
| JP | 2006011793 | 1/2006 |

(Continued)

OTHER PUBLICATIONS

Japanese Patent Application No. 2012-232927, First Office Action, mailed Jul. 23, 2013, (with English Translation).
Japanese Patent Application No. 2011-144869, Notice of Reasons for Rejection, mailed May 8, 2012, (with English Translation).

*Primary Examiner* — Zahid Choudhury
(74) *Attorney, Agent, or Firm* — Blakely, Sokoloff, Taylor & Zafman LLP

(57) ABSTRACT

According to one embodiment, an information processing apparatus includes a storage device, a setup module, an operation control module, and a setup value control module. The storage device stores power-saving setup information including at least one setup item relating to an operation of the apparatus. The setup module sets up a value of the at least one setup item in accordance with a user operation. The setup value control module acquires first setup information including a first setup value corresponding to the at least one setup item, and applies a setup value with a higher power-saving effect, which is selected between the first setup value and a current setup value of the at least one setup item, to the at least one setup item.

11 Claims, 9 Drawing Sheets

(56) References Cited

U.S. PATENT DOCUMENTS

| | | | |
|---|---|---|---|
| 2008/0016379 A1* | 1/2008 | Nijhawam et al. | 713/320 |
| 2008/0162956 A1* | 7/2008 | Bozek et al. | 713/310 |
| 2009/0172430 A1 | 7/2009 | Takenouchi | |
| 2009/0276647 A1* | 11/2009 | Boyd | 713/320 |
| 2009/0313487 A1* | 12/2009 | Lee | 713/300 |
| 2010/0162013 A1 | 6/2010 | Oh et al. | |
| 2012/0233480 A1* | 9/2012 | Tanaka | 713/320 |
| 2012/0297209 A1* | 11/2012 | Suurballe | 713/300 |

FOREIGN PATENT DOCUMENTS

| | | |
|---|---|---|
| JP | 2006352479 | 12/2006 |
| JP | 2007219835 | 8/2007 |
| JP | 2009-157840 | 7/2009 |
| JP | 2010-146546 | 7/2010 |
| JP | 2010-281466 | 12/2010 |
| WO | WO 2011064933 A1 * | 6/2011 |

* cited by examiner

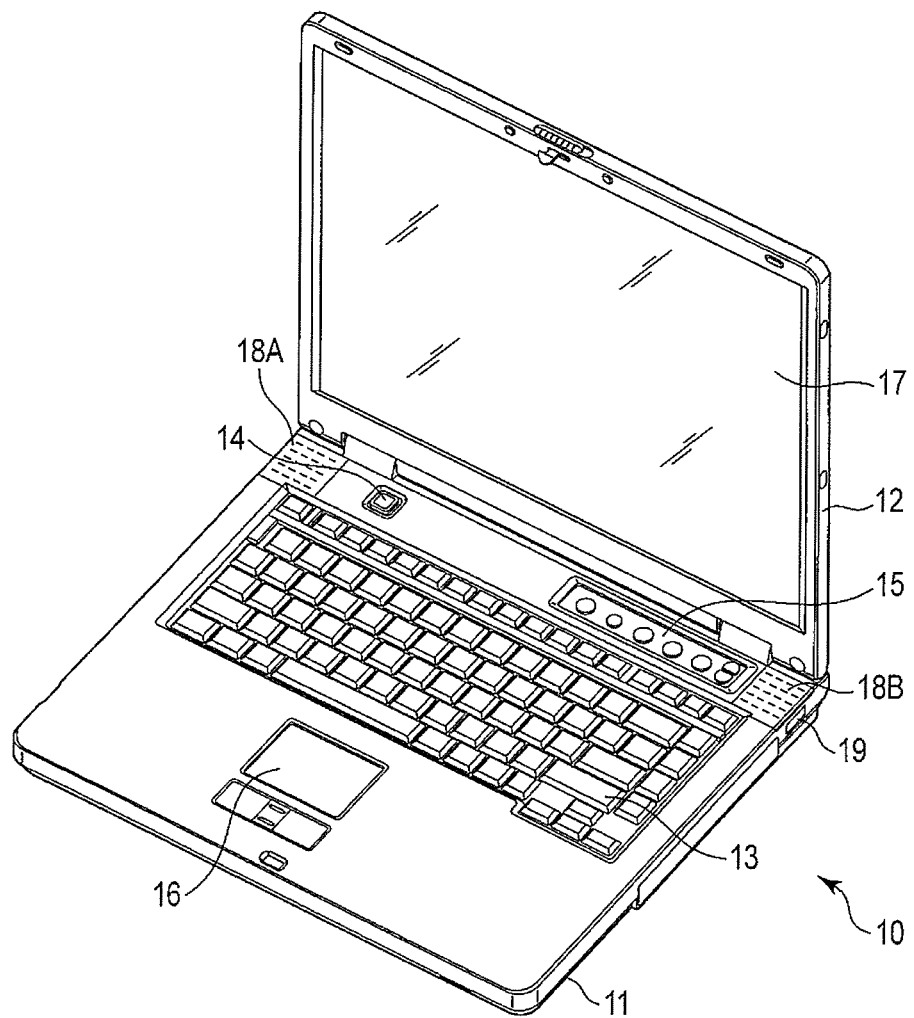
F I G. 1

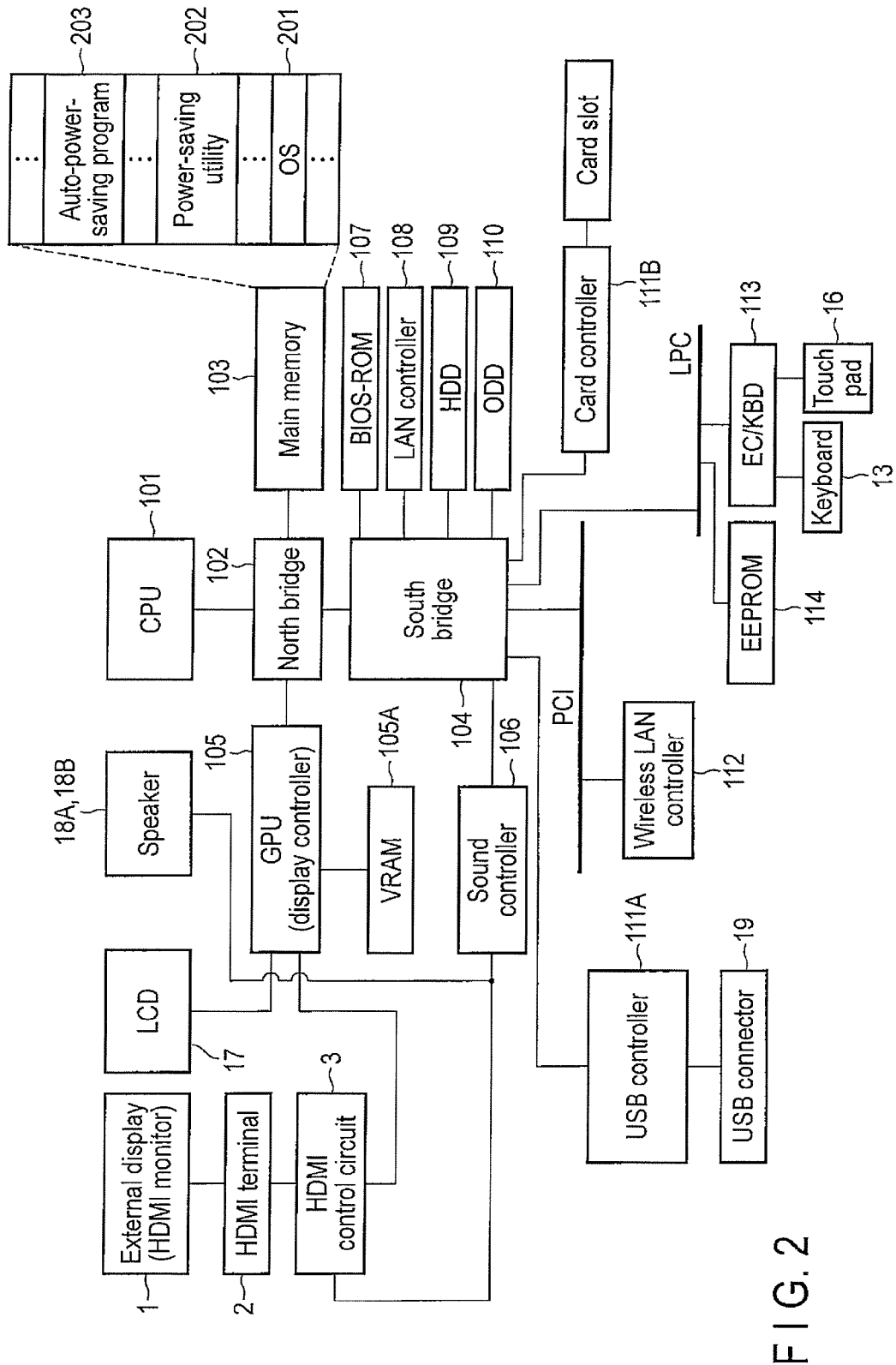
F I G. 2

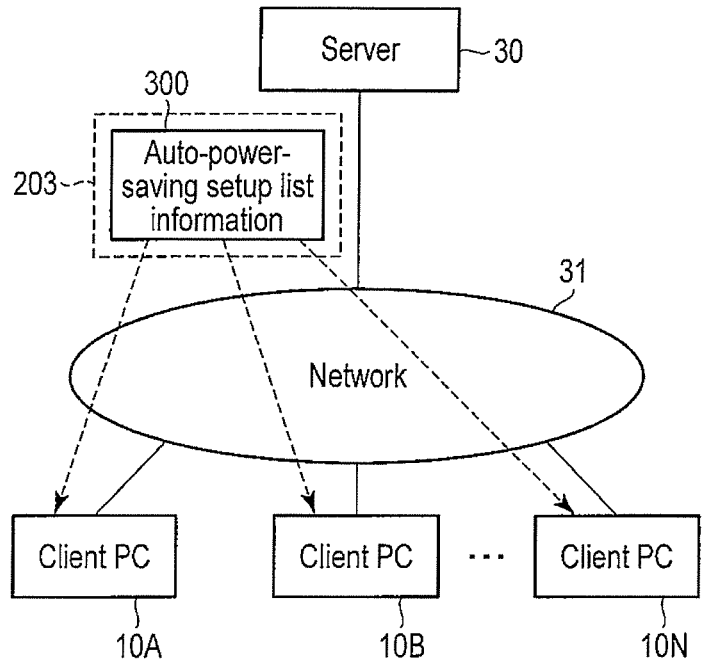
F I G. 3
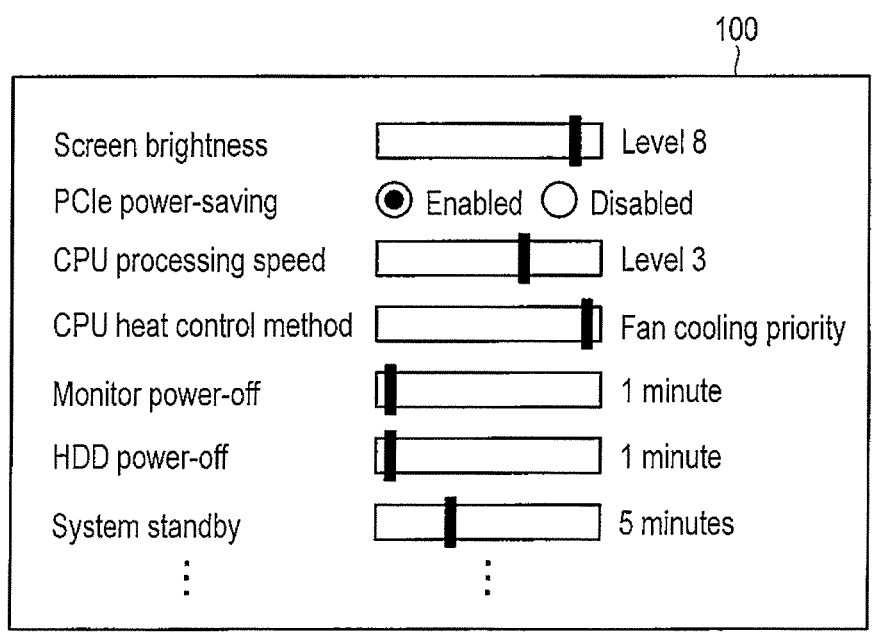
F I G. 4

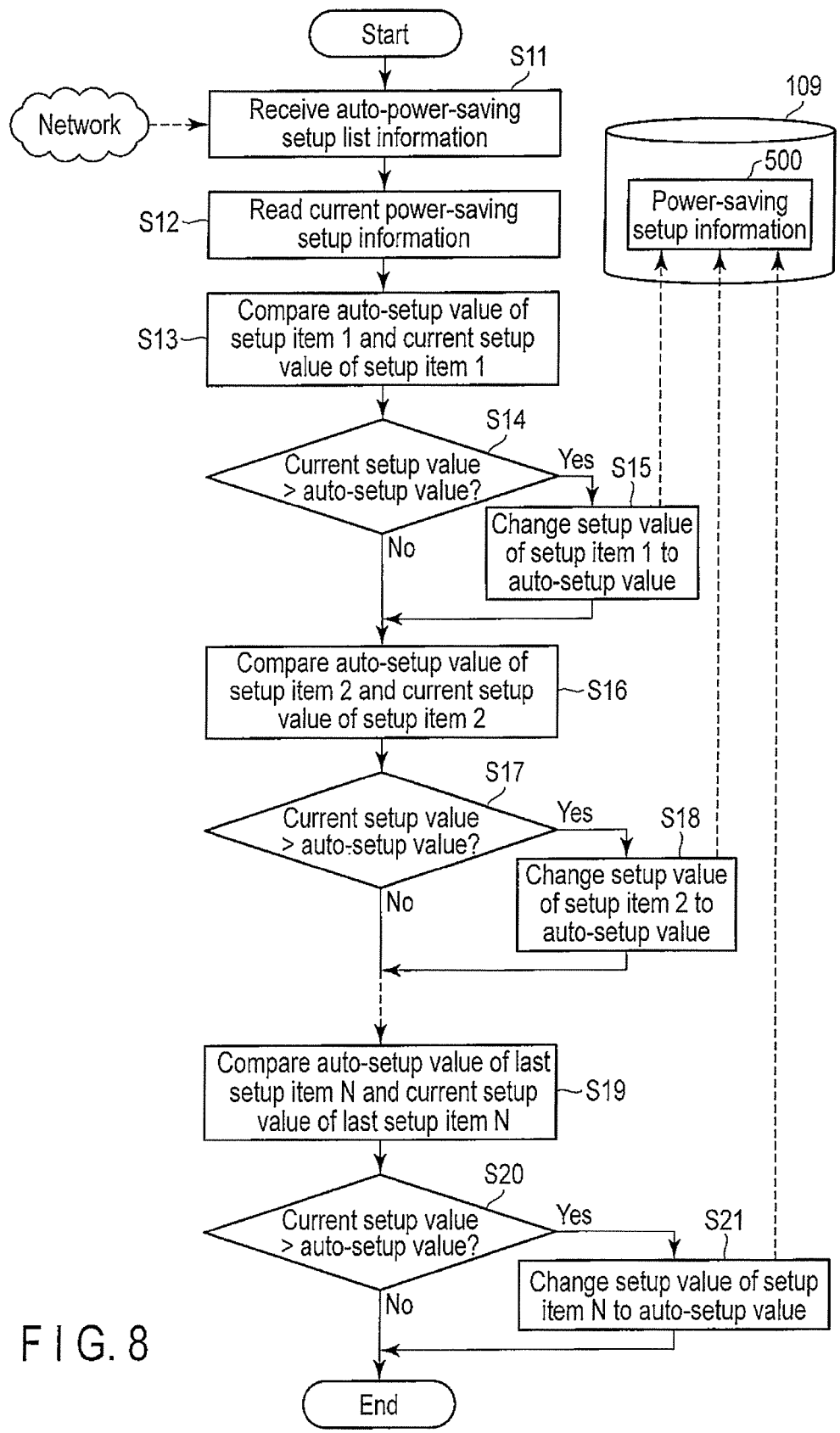
F I G. 8

INFORMATION PROCESSING APPARATUS AND OPERATION CONTROL METHOD

CROSS-REFERENCE TO RELATED APPLICATIONS

This application is based upon and claims the benefit of priority from prior Japanese Patent Application No. 2011-144869, filed Jun. 29, 2011, the entire contents of which are incorporated herein by reference.

FIELD

Embodiments described herein relate generally to an information processing apparatus and an operation control method which is applied to this apparatus.

BACKGROUND

In recent years, various information processing apparatuses, such as a personal computer (PC), a PDA, a tablet and a smart-phone, have been developed. Most of such information processing apparatuses have a power-saving function. The power-saving function is a function for setting up an operational environment which affects the amount of power that is consumed by the system, and, in some cases, the power-saving function is called "power management function". Using the power-saving function of the PC, the user can set up the PC in one of various operational environments with different amounts of power consumption.

Recently, attention has been paid to the power-saving function of the PC, from the standpoint of energy saving. If the power-saving functions of PCs in homes and PCs in companies are properly utilized, it is possible that a great deal of power can be saved.

However, the operation of setting up the power-saving function of the PC is not necessarily easy for users. Thus, there are cases in which the power-saving function of the PC is not properly used. For many users, a function for auto-setting the power-saving function of the PC may be effective. However, if such an auto-setting function is simply used, it is possible that the power consumption of the PC may increase, on the contrary. The reason for this is that some users who are skilled in PC operations or some users who are highly conscious of power saving have already set up PCs in a sufficiently low power-consumption state. Therefore, there has been a demand for a novel function for realizing a decrease in power consumption.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary perspective view illustrating the external appearance of an information processing apparatus according to an embodiment;

FIG. 2 is an exemplary block diagram illustrating the system configuration of the information processing apparatus of the embodiment;

FIG. 3 is a view illustrating a configuration example of a computer network to which the information processing apparatus of the embodiment is connected;

FIG. 4 is a view for explaining examples of power-saving setup items which are supported by a power-saving function of the information processing apparatus of the embodiment;

FIG. 8 is a flow chart illustrating an example of a procedure of a power-saving setup process which is executed by the information processing apparatus of the embodiment;

DETAILED DESCRIPTION

Figure 5:
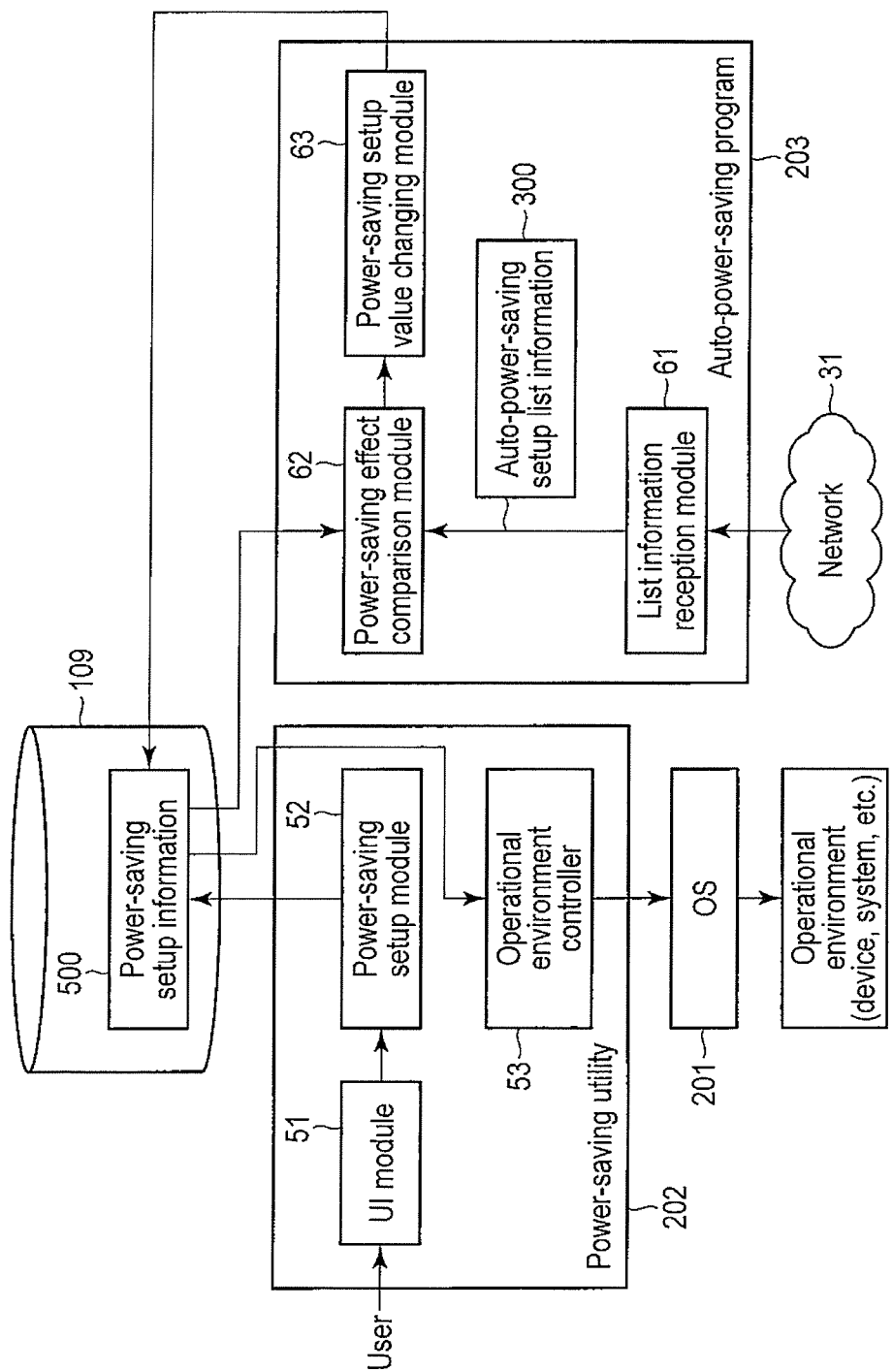
FIG. 5 is an exemplary block diagram illustrating functional configurations of a power-saving utility program and an auto-power-saving program, which are executed by the information processing apparatus of the embodiment.

Various embodiments will be described hereinafter with reference to the accompanying drawings.

In general, according to one embodiment, an information processing apparatus comprises a storage device, a setup module, an operation control module, and a setup value control module. The storage device is configured to store power-saving setup information including at least one setup item relating to an operation of the information processing apparatus which affects an amount of power consumed by the information processing apparatus. The setup module is configured to set up a value of the at least one setup item in accordance with a user operation. The operation control module is configured to control the operation of the information processing apparatus, based on a setup value of the at least one setup item. The setup value control module is configured to acquire first setup information including a first setup value corresponding to the at least one setup item, and to apply a setup value with a higher power-saving effect, which is selected between the first setup value and a current setup value of the at least one setup item, to the at least one setup item.

FIG. 1 is a perspective view showing the external appearance of an information processing apparatus according to an embodiment. This information processing apparatus is an electronic apparatus such as a personal computer (PC), a PDA, a tablet, a smart-phone, or a TV. In the description below, the case is assumed that the information processing apparatus is realized as a notebook-type personal computer 10.

As shown in FIG. 1, the computer 10 is composed of a computer main body 11 and a display unit 12. An LCD (liquid crystal display) 17 is built in the display unit 12. The display unit 12 is attached to the computer main body 11 such that the display unit 12 is rotatable between an open position where the top surface of the computer main body 11 is exposed, and a closed position where the top surface of the computer main body 11 is covered.

The computer main body 11 has a thin box-shaped housing. A keyboard 13, a power button 14 for powering on/off the computer 10, an input operation panel 15, a pointing device 16 such as a touch pad, and speakers 18A and 18B are disposed on the top surface of the housing of the computer main body 11. Various operation buttons are provided on the input operation panel 15.

The right side surface of the computer main body 11 is provided with a USB (universal serial bus) connector 19. Various peripheral devices can be connected to the USB connector 19. An external display connection terminal (not shown), which supports, e.g. the HDMI (high-definition multimedia interface) standard, is provided on the rear surface of the computer main body 11. The external display connection terminal is used to output a digital video signal to an external display.

FIG. 2 is a view illustrating the system configuration of the computer 10.

The computer 10, as shown in FIG. 2, comprises a CPU 101, a north bridge 102, a main memory 103, a south bridge 104, a graphics processing unit (GPU) 105, a video RAM (VRAM) 105A, a sound controller 106, a BIOS-ROM 107, a LAN controller 108, a hard disk drive (HDD) 109, an optical disc drive (ODD) 110, a USB controller 111A, a card controller 111B, a wireless LAN controller 112, an embedded controller/keyboard controller (EC/KBC) 113, and an EEPROM 114.

The CPU 101 is a processor for controlling the operations of the respective components in the computer 10. The CPU 101 executes an operating system (OS) 201, various utility programs and various application programs, which are loaded from the HDD 109 into the main memory 103. The utility programs include a power-saving utility program 202 and an auto-power-saving program 203.

The power-saving utility program 202 is a program for setting up values of power-saving setup items in power-saving setup information in accordance with a user operation, and controlling the operation (operational environment) of the computer 10, based on the setup values of the respective power-saving setup items. The power-saving setup information includes, as the above-described power-saving setup items, a plurality of setup items relating to the operation of the computer 10, which affects the amount of power consumed by the computer 10.

The auto-power-saving program 203 is a program for acquiring reference setup information and automatically setting up values of one or more predetermined power-saving setup items, based on the reference setup information. The reference setup information is setup information for setting up the computer 10 in a predetermined power-saving state, and includes, for instance, setup values (hereinafter referred to as "reference setup values") corresponding to some specific power-saving setup items. For example, in a company, the reference setup information is created by a system management department, and is transmitted to individual computers in the company via a network, etc.

By executing the auto-power-saving program 203, the operational environment of the computer 10 can easily be set in the power-saving state, without a user operation for setting up individual power-saving setup items. However, it is possible that some user has already set up the computer 10 in a sufficient power-saving state by using the power-saving utility program 202. In this case, if the auto-power-saving program 203 is executed to automatically apply a setup value of the reference setup information to some power-saving setup item, the power consumed by the computer 10 may possibly increase, on the contrary.

Thus, in the present embodiment, the auto-power-saving program 203 is configured such that a setup value with a higher power-saving effect, which is selected between a reference setup value corresponding to a first power-saving setup item of a setup target and a current setup value corresponding to the first power-saving setup item, is applied to the first power-saving setup item. For example, if the current setup value relating to the first power-saving setup item has a higher power-saving effect than the reference setup value relating to the first power-saving setup item, the setup value of the first power-saving setup item is not changed to the reference setup value, and is maintained. Thereby, the power-saving function of the computer 10 can properly be used.

Besides, the CPU 101 executes a BIOS that is stored in the BIOS-ROM 107. The BIOS is a program for hardware control.

The north bridge 102 is a bridge device which connects a local bus of the CPU 101 and the south bridge 104. The north bridge 102 includes a memory controller which access-controls the main memory 103. The north bridge 102 also has a function of communicating with the GPU 105 via, e.g. a PCI EXPRESS serial bus.

The GPU 105 is a display controller which controls the LCD 17 that is used as a display monitor of the computer 10. A display signal, which is generated by the GPO 105, is sent to the LCD 17. In addition, the GPO 105 can send a digital video signal to an external display 1 via an HDMI control circuit 3 and an HDMI terminal 2.

The HDMI terminal 2 is the above-described external display connection terminal. The HDMI terminal 2 is capable of sending a non-compressed digital video signal and a digital audio signal to the external display 1, such as a TV, via a single cable. The HDMI control circuit 3 is an interface for sending a digital video signal to the external display 1, which is called "HDMI monitor", via the HDMI terminal 2.

The south bridge 104 controls devices on a PCI (Peripheral Component Interconnect) bus and devices on an LPC (Low Pin Count) bus. The south bridge 104 includes an IDE (Integrated Drive Electronics) controller for controlling the HDD 109 and ODD 110. The south bridge 104 also has a function of communicating with the sound controller 106.

The sound controller 106 is a sound source device and outputs audio data, which is a playback target, to the speakers 18A and 18B or the HDMI control circuit 3. The LAN controller 108 is a wired communication device which executes wired communication of, e.g. the IEEE 802.3 standard. On the other hand, the wireless LAN controller 112 is a wireless communication device which executes wireless communication of, e.g. the IEEE 802.11 standard. The USB controller 111A communicates with an external device which is connected via the USB connector 19. The card controller 111B executes data write and data read in/from a memory card which is inserted in a card slot provided in the computer main body 11.

The EC/KBC 113 is a one-chip microcomputer in which an embedded controller for power management and a keyboard controller for controlling the keyboard 13 and touch pad 16 are integrated. The EC/KBC 113 has a function of powering on/off the computer 10 in accordance with the user's operation of the power button 14.

Next, referring to FIG. 3, a configuration example of a computer network, to which the computer 10 is connected, is described.

FIG. 3 illustrates a computer network system in a company. A server computer 30 and a great number of client PCs 10A, 10B, . . . , 10N are connected to a network 31 such as a LAN or an intranet. Each of the client PCs 10A, 10B, . . . , 10N includes the same functions as the computer 10.

The server computer 30 transmits auto-power-saving setup list information 300 to the client PCs 10A, 10B, . . . , 10N via the network 31. The auto-power-saving setup list information 300 is the above-described reference setup information. The auto-power-saving setup list information 300 includes power-saving setup values (reference setup values) corresponding to some power-saving setup items, which are to be applied to the respective client PCs. Each of the client PCs 10A, 10B, . . . , 10N receives the auto-power-saving setup list information 300 from the server computer 30, and sets up the power-saving function of each client PC 10A, 10B, . . . , 10N, based on the auto-power-saving setup list information 300.

As a method of transmitting the auto-power-saving setup list information 300 to each client PC from the server computer 30, use may be made of a method of using client management software which is executed on the server computer 30. The client management software is a program which manages each client PC, and delivers a program to each client PC and causes each client PC to execute the program, or monitors the program installed in each client PC. By transmitting the auto-power-saving setup list information 300 to each client PC by using the client management software, it is possible to comprehensively set up the respective PCs in a predetermined power-saving state.

In the meantime, it is possible to prepare an auto-power-saving program 203 including the auto-power-saving setup list information 300, and to transmit this auto-power-saving program 203 from the server computer 30 to each client PC. In this case, the auto-power-saving program 203 may be a program of an executable file format. The auto-power-saving program 203 may be configured to be automatically executed on the client PC, when the auto-power-saving program 203 has been transmitted to the client PC. When the auto-power-saving program 203 has been executed, the auto-power-saving program 203 acquires the auto-power-saving setup list information 300 within this auto-power-saving program 203, and sets the values of the respective power-saving setup items, based on the auto-power-saving setup list information 300.

As the method of delivering the auto-power-saving setup list information 300 to each client PC, use may be made of, instead of the method of delivering via the network, a method of delivering the auto-power-saving setup list information 300 to each client PC with use of storage media (removable media) storing the auto-power-saving setup list information 300.

Next, referring to FIG. 4, a description is given of examples of power-saving setup items which are supported by the power-saving utility program 202.

In FIG. 4, numeral 100 denotes a power-saving setup screen. The power-saving setup screen 100 is a GUI which is displayed on the display screen of the LCD 17 by the power-saving utility program 202 when the power-saving utility program 202 is executed. Using the power-saving setup screen 100, the user can set up values of the respective power-saving setup items. The respective power-saving setup items, which are supported by the power-saving utility program 202, are used in order to set up the operational environment of the computer 10, which affects the amount of power consumed by the computer 10. The power-saving setup items include, for example, the following setup items:

Screen brightness: This setup item is used in order to control the luminance of the display screen. The range of adjustment of the brightness (luminance) of the display screen is, for example, from level 1 (darkest) to level 10 (brightest). The default setup value of the screen brightness may be, for example, level 10.

PCIe power-saving: This setup item is used in order to control the power-saving mode of a serial bus of the PCI EXPRESS standard. Either a setup value which enables this power-saving mode, or a setup value which disables this power-saving mode, can be selected. The default setup value of the PCIe power-saving may be, for example, "Disabled".

CPU processing speed: This setup item is used in order to control the processing speed of the CPU 101. The range of adjustment of the processing speed of the cup 101 is from level 1 (lowest speed) to level 5 (highest speed). The default setup value of the CPU processing speed may be, for example, level 5.

CPU heat control method: This setup item is used in order to select a method of cooling the CPU 101. Cooling methods include a CPU speed decrease priority mode in which the CPU processing speed is lowered in accordance with the rise in temperature of the CPU 101, and a fan cooling priority mode in which the rotation speed of the fan is increased in accordance with the rise in temperature of the CPU 101. The power consumed by the computer 10 in the CPU speed decrease priority mode is less than the power consumed by the computer 10 in the fan cooling priority mode. The default setup value of the heat control method of the CPU 101 may be, for example, the fan cooling priority mode.

Monitor power-off: This setup item is used in order to execute control to power off the display at an idle time. For this setup item, there are provided a setup value which disables the control to power off the display, and a setup value which enables the control to power off the display. Further, as the setup value which enables the control to power off the display, there are provided a plurality of setup values which are indicative of times from the idling of the system to the power-off of the display. The default setup value of this setup item may be, for example, "Disabled".

HDD power-off: This setup item is used in order to execute control to power off the HDD at an idle time. For this setup item, there are provided a setup value which disables the control to power off the HDD, and a setup value which enables the control to power off the HDD. Further, as the setup value which enables the control to power off the HDD, there are provided a plurality of setup values which are indicative of times from the idling of the system to the power-off of the HDD. The default setup value of this setup item may be, for example, "Disabled".

System standby: This setup item is used in order to execute control to transition the system to a standby state at an idle time. For this setup item, there are provided a setup value which disables the control to transition the system to the standby state, and a setup value which enables the control to transition the system to the standby state. Further, as the setup value which enables the control to transition the system to the standby state, there are provided a plurality of setup values which are indicative of times from the idling of the system to the transition of the system to the standby state. The default setup value of this setup item may be, for example, "Disabled".

Next, referring to FIG. 5, the functional configurations of the power-saving utility program 202 and auto-power-saving program 203 are described.

The power-saving utility program 202 includes, as function execution modules, a user interface (UI) module 51, a power-saving setup module 52 and an operational environment controller 53. The user interface (UI) module 51 displays on the display the power-saving setup screen 100 described with reference to FIG. 4. In accordance with the user operation, the power-saving setup module 52 sets up values, which have been designated by the user, for the values of the respective power-saving setup items in power-saving setup information 500 stored in the HDD 109. The power-saving setup information 500 is information indicative of values corresponding to the many setup items described with reference to FIG. 4. The operational environment controller 53 controls the operation (operational environment) of the computer 10, based on the values (setup values) of the respective setup items in the power-saving setup information 500. The control of the operation (operational environment) of the computer 10 is executed via the OS 201.

The auto-power-saving program 203 includes, as function execution modules, a list information reception module 61, a power-saving effect comparison module 62 and a power-saving setup value changing module 63. The list information reception module 61 acquires the auto-power-saving setup list information 300. For example, the list information reception module 61 may receive the auto-power-saving setup list information 300 from the server computer 30 via the network 31.

The power-saving effect comparison module 62 and the power-saving setup value changing module 63 function as a setup value controller which applies either a reference setup value (also referred to as "auto-setup value") corresponding to a setup item that is a setup target included in the auto-power-saving setup list information 300, or a current setup value of the setup item of the setup target, which has a higher power-saving effect, to the setup item of the setup target.

The power-saving effect comparison module 62 compares a reference setup value corresponding to a setup item of a setup target and a current setup value of the setup item of the setup target, and selects that one of the reference setup value and the current setup value, which has a higher power-saving effect. The power-saving setup value changing module 63 applies the setup value, which has been selected by the power-saving effect comparison module 62, to the setup item of the setup target. To be more specific, when the power-saving effect corresponding to the reference setup value (i.e. the power-saving effect in the case of applying the reference setup value to the setup item of the setup target) is higher than the power-saving effect corresponding to the current setup value, the power-saving setup value changing module 63 changes the current setup value, which corresponds to the setup item of the setup target in the power-saving setup information 500, to the reference setup value. On the other hand, when the power-saving effect corresponding to the current setup value is higher than the power-saving effect corresponding to the reference setup value (i.e. the power-saving effect in the case of applying the reference setup value to the setup item of the setup target), the power-saving setup value changing module 63 does not change the value of the setup item of the setup target in the power-saving setup information 500, and maintains the current setup value.

Figure 6:
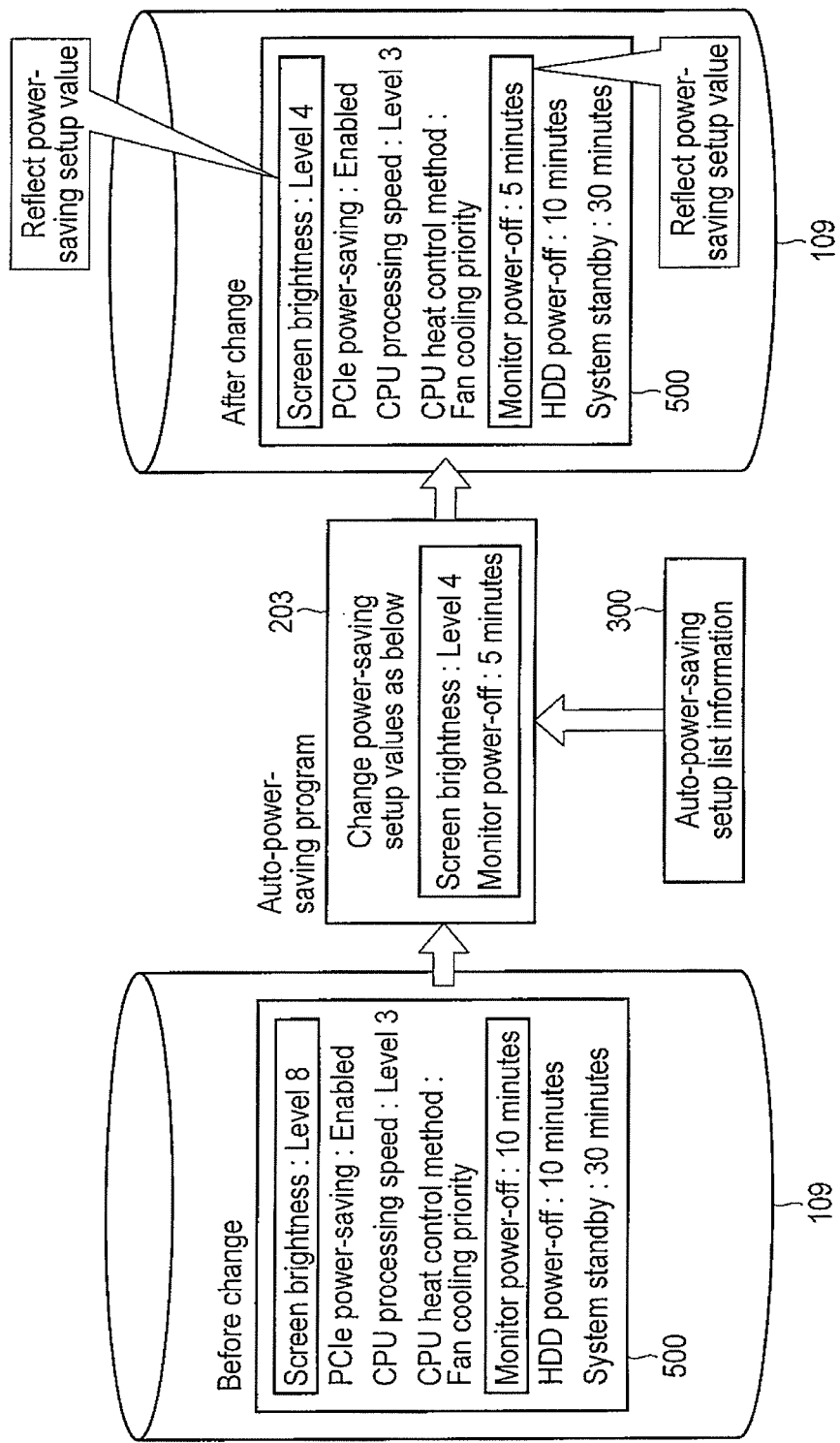
FIG. 6 is an exemplary view for explaining a state in which current power-saving setup values are changed by the auto-power-saving program which is executed by the information processing apparatus of the embodiment.
Figure 7:
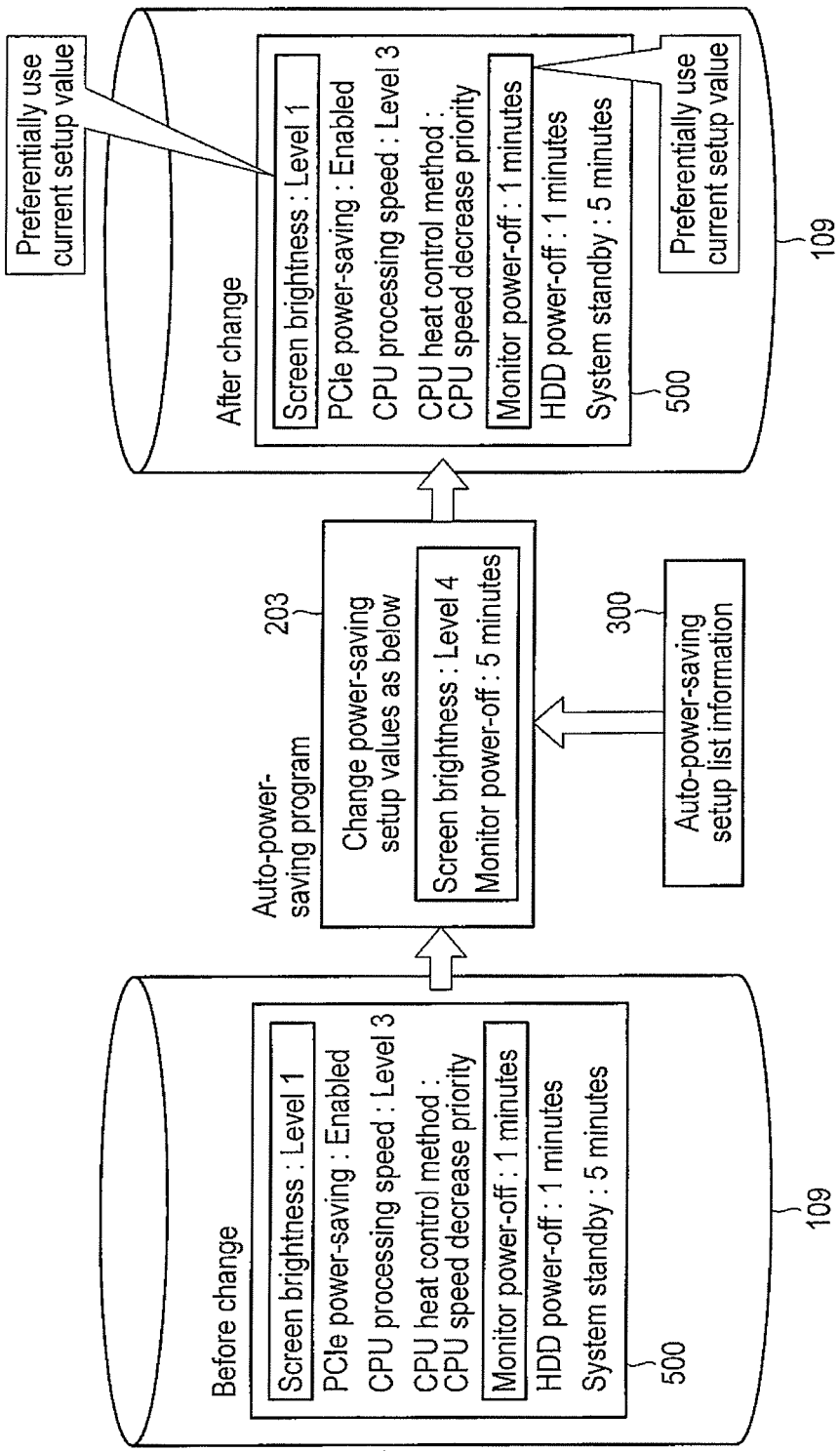
FIG. 7 is an exemplary view for explaining a state in which current power-saving setup values are not changed and are maintained by the auto-power-saving program which is executed by the information processing apparatus of the embodiment.

Next, referring to FIG. 6 and FIG. 7, a description is given of a setup value changing process by the auto-power-saving program 203.

In FIG. 6, the case is assumed that setup values relating to two setup items are defined in the auto-power-saving setup list information 300. Specifically, the auto-power-saving setup list information 300 includes a setup value which designates that the "screen brightness" is to be set at level 4, and a setup value which designates that the "time until monitor power-off" is to be set at 5 minutes. Assume now the case in which the current setup values of the respective setup items in the power-saving setup information 500 are set, as shown in FIG. 6, such that "screen brightness"=level 8, "PCIe power-saving"=enabled, "CPU processing speed"=level 3, "CPU heat control method"=fan cooling priority, "monitor power-off"=10 minutes, "HDD power-off"=10 minutes, and "system standby"=30 minutes.

The auto-power-saving program 203 acquires the auto-power-saving setup list information 300, and recognizes that the power-saving setup items of setup targets are the "screen brightness" and "monitor power-off". The auto-power-saving program 203 reads the current setup value (=level 8) of the "screen brightness" from the power-saving setup information 500, and compares the current setup value (=level 8) and the reference setup value (=level 4). Since the power-saving effect level of the reference setup value is higher than that of the current setup value, the auto-power-saving program 203 changes the setup value of the "screen brightness" in the power-saving setup information 500 to the reference setup value (=level 4). As regards the "screen brightness" and "CPU processing speed", it is determined that the power consumption level is higher (the power-saving effect level is lower) as the level indicated by the setup value is higher, and that the power consumption level is lower (the power-saving effect level is higher) as the level indicated by the setup value is lower.

In addition, the auto-power-saving program 203 reads the current setup value (=10 minutes) of the "monitor power-off" from the power-saving setup information 500, and compares the current setup value (=10 minutes) and the reference setup value (=5 minutes). Since the power-saving effect level of the reference setup value is higher than that of the current setup value, the auto-power-saving program 203 changes the setup value of the "monitor power-off" in the power-saving setup information 500 to the reference setup value (=5 minutes).

As regards the "monitor power-off", "HDD power-off" and "system standby", it is determined that the power consumption level is higher (the power-saving effect level is lower) as the time indicated by the setup value is longer, and that the power consumption level is lower (the power-saving effect level is higher) as the time indicated by the setup value is shorter. In addition, as regards the "PCIe power-saving", it is determined that the power consumption level is lower (the power-saving effect level is higher) in the case of the setup value indicative of "enabled" than in the case of the setup value indicative of "disabled". As regards the "CPU heat control method", it is determined that the power consumption level is lower (the power-saving effect level is higher) in the case of the setup value indicative of "CPU speed decrease priority" than in the case of the setup value indicative of "fan cooling priority". Besides, as regards the "monitor power-off", "HDD power-off" and "system standby", it is determined that the power consumption level is lower (the power-saving effect level is higher) in the case of the setup value indicative of "enabled" than in the case of the setup value indicative of "disabled".

Next, assume the case in which the current setup values of the respective setup items in the power-saving setup information 500 are set, as shown in FIG. 7, such that "screen brightness"=level 1, "PCIe power-saving"=enabled, "CPU processing speed"=level 3, "CPU heat control method"=CPU speed decrease priority, "monitor power-off"=1 minute, "HDD power-off"=1 minute, and "system standby"=5 minutes.

The auto-power-saving program 203 acquires the auto-power-saving setup list information 300, and recognizes that the power-saving setup items of setup targets are the "screen brightness" and "monitor power-off". The auto-power-saving program 203 reads the current setup value (=level 1) of the "screen brightness" from the power-saving setup information 500, and compares the current setup value (=level 1) and the reference setup value (=level 4). Since the power-saving effect level of the current setup value is higher than that of the reference setup value, that is, since the current setup value is indicative of a lower power consumption value than the reference setup value, the auto-power-saving program 203 maintains the setup value of the "screen brightness" in the power-saving setup information 500 to be the current setup value (=level 1).

In addition, the auto-power-saving program 203 reads the current setup value (=1 minute) of the "monitor power-off" from the power-saving setup information 500, and compares the current setup value (=1 minute) and the reference setup value (=5 minutes). Since the power-saving effect level of the current setup value is higher than that of the reference setup value, that is, since the current setup value is indicative of a lower power consumption value than the reference setup value, the auto-power-saving program 203 maintains the setup value of the "monitor power-off" in the power-saving setup information 500 to be the current setup value (=1 minute).

Next, referring to a flow chart of FIG. 8, a description is given of an example of the procedure of an auto-power-saving setup process which is executed by the auto-power-saving program 203.

The case is now assumed that the auto-power-saving setup list information 300 includes reference setup values (auto-setup values) corresponding to setup items 1 to N. The auto-power-saving program 203 first acquires the auto-power-saving setup list information 300 (step S11). In step S11, the auto-power-saving program 203 may receive the auto-power-saving setup list information 300 from the server computer 30 via the network. The auto-power-saving program 203 reads the power-saving setup information 500 stored in the HDD 109 (step S12).

The auto-power-saving program 203 compares an auto-setup value of the setup item 1, which is designated by the auto-power-saving setup list information 300, and a current setup value of the setup item 1 (step S13). If the power consumption level corresponding to the auto-setup value is lower than the power consumption level corresponding to the current setup value, that is, if the power-saving effect of the auto-setup value is higher than the power-saving effect of the current setup value (YES in step S14), the auto-power-saving program 203 changes the current setup value, which corresponds to the setup item 1 in the power-saving setup information 500, to the value designated by the auto-setup value (step S15). If the power consumption level corresponding to the auto-setup value is equal to or higher than the power consumption level corresponding to the current setup value (NO in step S14), the process of step S15 is skipped. Thereby, the value of the setup item 1 is maintained to be the current setup value.

Subsequently, the auto-power-saving program 203 compares an auto-setup value of the setup item 2, which is designated by the auto-power-saving setup list information 300, and a current setup value of the setup item 2 (step S16). If the power consumption level corresponding to the auto-setup value is lower than the power consumption level corresponding to the current setup value, that is, if the power-saving effect of the auto-setup value is higher than the power-saving effect of the current setup value (YES in step S17), the auto-power-saving program 203 changes the current setup value, which corresponds to the setup item 2 in the power-saving setup information 500, to the value designated by the auto-setup value (step S18). If the power consumption level corresponding to the auto-setup value is equal to or higher than the power consumption level corresponding to the current setup value (NO in step S17), the process of step S18 is skipped. Thereby, the value of the setup item 2 is maintained to be the current setup value.

Then, the auto-power-saving program 203 compares an auto-setup value of the setup item N, which is designated by the auto-power-saving setup list information 300, and a current setup value of the setup item N (step S19). If the power consumption level corresponding to the auto-setup value is lower than the power consumption level corresponding to the current setup value, that is, if the power-saving effect of the auto-setup value is higher than the power-saving effect of the current setup value (YES in step S20), the auto-power-saving program 203 changes the current setup value, which corresponds to the setup item N in the power-saving setup information 500, to the value designated by the auto-setup value (step S21). If the power consumption level corresponding to the auto-setup value is equal to or higher than the power consumption level corresponding to the current setup value (NO in step S20), the process of step S21 is skipped. Thereby, the value of the setup item N is maintained to be the current setup value.

As has been described above, in the auto-power-saving setup process of the present embodiment, the power-saving effect of a reference setup value corresponding to a certain power-saving setup item is compared with the power-saving effect of a current setup value corresponding to this power-saving setup item. The setup value with the higher power-saving effect is selected, and the selected setup value is applied to the power-saving setup item.

In the meantime, the method of preferentially using the setup value with the higher power-saving effect is applicable to not only the auto-power-saving program 203, but also the power-saving utility program 202. In this case, information (power-saving mode profile information) including power-saving setup values for setting the computer 10 in a power-saving mode may be used instead of the above-described auto-power-saving setup list information 300. The power-saving mode profile information may be prestored in the HDD 109.

Figure 9:
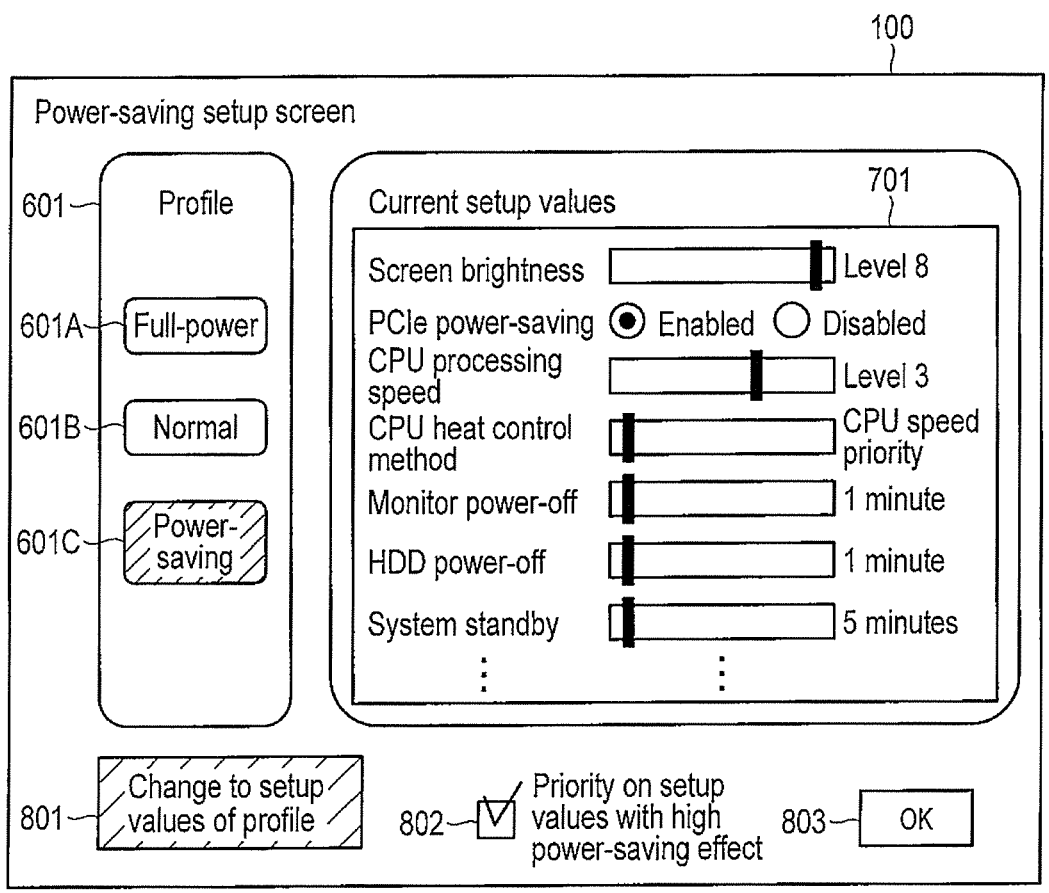
FIG. 9 is a view illustrating an example of a power-saving setup screen which is used by the information processing apparatus of the embodiment.

FIG. 9 illustrates another example of the power-saving setup screen 100 which is displayed by the power-saving utility program 202.

On the power-saving setup screen 100, a profile display area 601, a setup area 701 for displaying setup values of respective setup items and changing the setup values, a setup change button 801, a check box 802 and an OK button 803, are displayed. In the profile display area 601, a full-power button 601A, a normal button 601B and a power-saving button 601C are displayed. The full-power button 601A is a button for collectively setting up the above-described many power-saving setup items at values which are preset in order to prioritize the system performance over the power-saving. The normal button 601B is a button for collectively setting up the above-described many power-saving setup items at values which are preset so as to control the system performance and power-saving in a well-balanced manner. The power-saving button 601C is a button for collectively setting up the above-described many power-saving setup items at values which are preset in order to prioritize the power-saving over the system performance.

For example, if the setup change button 801 is pressed by the user in the state in which one of the profiles of the full-power button 601A, normal button 601B and power-saving button 601C is selected by the user, the setup values corresponding to the currently selected profile (i.e. default setup values corresponding to the currently selected profile) are displayed in the setup area 701 as current setup values. If the OK button 803 is pressed in this state, the setup values corresponding to the currently selected profile are applied to the values of the respective setup items in the power-saving setup information 500.

When a check mark is placed in the check box 802, current setup values are preferentially applied in the case where the power-saving effect of the current setup values is higher than the power-saving effect of the setup values defined in the selected profile. The check box 802 may be configured to be usable, for example, only when the power-saving button 601C is selected, that is, only when the default setup values corresponding to the profile of the power-saving mode are applied to the power-saving setup information 500.

Figure 10:
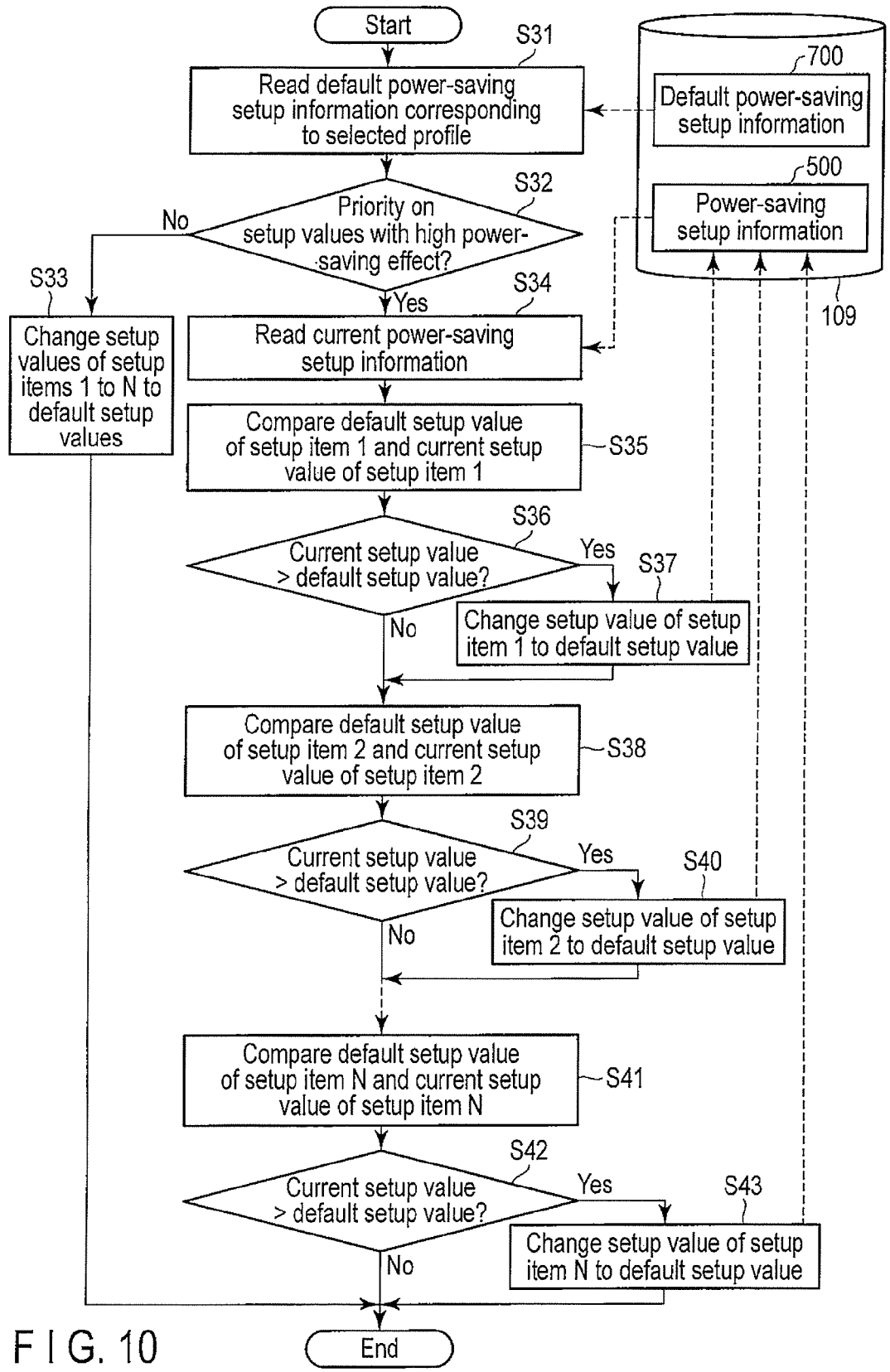
FIG. 10 is a flow chart illustrating an example of another procedure of the power-saving setup process which is executed by the information processing apparatus of the embodiment.

Next, referring to a flow chart of FIG. 10, a description is given of the procedure of a power-saving setup process which is executed by the power-saving utility program 202. This power-saving setup process is executed, for example, when default setup values corresponding to a selected profile are applied to the power-saving setup information 500.

The power-saving utility program 202 first acquires default power-saving setup information 700 corresponding to a selected profile (in this example, the profile of the power-saving mode) (step S31). In step S31, the power-saving utility program 202 reads the default power-saving setup information 700 stored in the HDD 109. The case is now assumed that the default power-saving setup information 700 includes reference setup values (default setup values) corresponding to setup items 1 to N.

Then, the power-saving utility program 202 determines whether the check box 802 is marked or not, that is, whether an option of preferentially using setup values with a high power-saving effect is selected (step S32). If this option is not selected (NO in step S32), the power-saving utility program 202 changes the current setup values, which correspond to the setup items 1 to N in the power-saving setup information 500, to the reference setup values (default values) corresponding to the setup items 1 to N in the default power-saving setup information 700 (step S33).

If this option is selected (YES in step S32), the power-saving utility program 202 reads the power-saving setup information 500 stored in the HDD 109 (step S34).

The power-saving utility program 202 compares a default setup value of the setup item 1, which is designated by the default power-saving setup information 700, and a current setup value of the setup item 1 (step S35). If the power consumption level corresponding to the default setup value is lower than the power consumption level corresponding to the current setup value, that is, if the power-saving effect of the default setup value is higher than the power-saving effect of the current setup value (YES in step S36), the power-saving utility program 202 changes the current setup value, which corresponds to the setup item 1 in the power-saving setup information 500, to the value designated by the default setup value (step S37). If the power consumption level corresponding to the default setup value is equal to or higher than the power consumption level corresponding to the current setup value (NO in step S36), the process of step S37 is skipped.

Subsequently, the power-saving utility program 202 compares a default setup value of the setup item 2, which is designated by the default power-saving setup information 700, and a current setup value of the setup item 2 (step S38). If the power consumption level corresponding to the default setup value is lower than the power consumption level corresponding to the current setup value, that is, if the power-saving effect of the default setup value is higher than the power-saving effect of the current setup value (YES in step S39), the power-saving utility program 202 changes the current setup value, which corresponds to the setup item 2 in the power-saving setup information 500, to the value designated by the default setup value (step S40). If the power consumption level corresponding to the default setup value is equal to or higher than the power consumption level corresponding to the current setup value (NO in step S39), the process of step S40 is skipped.

Then, the power-saving utility program 202 compares a default setup value of the setup item N, which is designated by the default power-saving setup information 700, and a current setup value of the setup item N (step S41). If the power consumption level corresponding to the default setup value is lower than the power consumption level corresponding to the current setup value, that is, if the power-saving effect of the default setup value is higher than the power-saving effect of the current setup value (YES in step S42), the power-saving utility program 202 changes the current setup value, which corresponds to the setup item N in the power-saving setup information 500, to the value designated by the default setup value (step S43). If the power consumption level corresponding to the default setup value is equal to or higher than the power consumption level corresponding to the current setup value (NO in step S42), the process of step S43 is skipped.

As has been described above, according to the present embodiment, the reference setup information including the reference setup value relating to a predetermined setup item is acquired, and either the reference setup value or the current setup value of the predetermined setup item, which has a higher power-saving effect, is applied to the predetermined setup item. Accordingly, when the computer 10 is currently used with the setup having a higher power-saving effect than the power-saving setup information (reference setup value) which is delivered by the administrator, the current power-saving setup can continuously be used. If the power-saving setup information (reference setup value), which is delivered by the administrator, has a higher power-saving effect than the current setup of the computer 10, the computer 10 can easily be set up in a lower power consumption state, based on the reference setup value. Therefore, the power consumption of the computer 10 can easily be reduced.

In the present embodiment, the description has been given of, by way of example, the case in which the power-saving setup information 500 includes a plurality of power-saving setup items. However, it should suffice if the power-saving setup information 500 includes at least one power-saving setup item.

Since all the procedures of the power-saving setup process of the embodiment can be executed by software, the same advantageous effects as with the present embodiment can easily be obtained simply by installing a program, which executes the procedures of the power-saving setup process, into an ordinary computer through a computer-readable storage medium which stores the program, and executing the program.

In addition, the respective functions illustrated in FIG. 5 may be realized by hardware such as a purpose-specific LSI, or a DSP.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a storage device configured to store power-saving setup information including at least a first setup item and a second setup item relating to an operation of the information processing apparatus which affects an amount of power consumed by the information processing apparatus; and
a processor configured to (i) set a value of each of the first setup item and the second setup item at a setup value designated by a user, (ii) control the operation of the information processing apparatus, based on a first current setup value of the first setup item and a second current setup value of the second setup item, and (iii) acquire first setup information for automatically setting values of the first setup item and the second setup item, the first setup information including a setup value corresponding to the first setup item and a setup value corresponding to the second setup item,
wherein the processor is configured to compare the setup value of the first setup item and the first current setup value of the first setup item, and apply one of the setup value of the first setup item and the first current setup value to the first setup item based on a result of the comparison, the one of the setup value of the first setup item and the first current setup value having a higher power-saving effect, and
wherein the processor is further configured to compare the setup value of the second setup item and the second current setup value of the second setup item, and apply one of the setup value of the second setup item and the second current setup value to the second setup item based on a result of the comparison, the one of the setup value of the second setup item and the second current setup value having a higher power-saving effect.

2. The information processing apparatus of claim 1, wherein the processor is configured to change the first current setup value to the first setup value when a power-saving effect corresponding to the first setup value is higher than a power-saving effect corresponding to the first current setup value, and to maintain the first current setup value when the power-saving effect corresponding to the first current setup value is higher than the power-saving effect corresponding to the first setup value.

3. The information processing apparatus of claim 1, wherein the processor is configured to receive the first setup information from a source remotely located from the information processing apparatus.

4. The information processing apparatus of claim 1, wherein the processor is configured to receive the first setup information from a server computer via a network.

5. An operation control method of controlling an operation of an information processing apparatus, comprising:
setting a value of each of a first setup item and a second setup item at a setup value designated by a user, the first setup item and the second setup item relating to an operation of the information processing apparatus which affects an amount of power consumed by the information processing apparatus;
controlling the operation of the information processing apparatus, based on a first current setup value of the first setup item and a second current setup value of the second setup item;
acquiring first setup information for automatically setting values of the first setup item and the second setup item, the first setup information including a setup value corresponding to the first setup item and a setup value corresponding to the second setup item
comparing the setup value of the first setup item and the first current setup value of the first setup item, and apply one of the setup value of the first setup item and the first current setup value to the first setup item based on a result of the comparison, the one of the setup value of the first setup item and the first current setup value having a higher power-saving effect; and
comparing the setup value of the second setup item and the second current setup value of the second setup item, and apply one of the setup value of the second setup item and the second current setup value to the second setup item based on a result of the comparison, the one of the setup value of the second setup item and the second current setup value having a higher power-saving effect.

6. The operation control method of claim 5, wherein said applying one of the setup value of the first setup item and the first current setup value to the first setup item includes changing the first current setup value to the first setup value when a power-saving effect corresponding to the first setup value is higher than a power-saving effect corresponding to the first current setup value, and maintaining the first current setup value when the power-saving effect corresponding to the first current setup value is higher than the power-saving effect corresponding to the first setup value.

7. A non-transitory computer readable medium having stored thereon a program, the program being configured to control a computer to execute functions of:
setting a value of each of a first setup item and a second setup item at a setup value designated by a user, the first setup item and the second setup item relating to an operation of the computer which affects an amount of power consumed by the computer;
controlling the operation of the computer, based on a first current setup value of the first setup item and a second current setup value of the second setup item;
acquiring first setup information for automatically setting values of the first setup item and the second setup item, the first setup information including a setup value corresponding to the first setup item and a setup value corresponding to the second setup item;
comparing the setup value of the first setup item and the first current setup value of the first setup item, and apply one of the setup value of the first setup item and the first current setup value to the first setup item based on a result of the comparison, the one of the setup value of the first setup item and the first current setup value having a higher power-saving effect; and
comparing the setup value of the second setup item and the second current setup value of the second setup item, and apply one of the setup value of the second setup item and the second current setup value to the second setup item based on a result of the comparison, the one of the setup value of the second setup item and the second current setup value having a higher power-saving effect.

8. The information processing apparatus of claim 1, wherein the first setup item relating to brightness of a display screen of the apparatus.

9. The operation control method of claim 5, wherein the first setup information is received from a source remotely located from the information processing apparatus.

10. The operation control method of claim 5, wherein the first setup information is received from a server computer via a network.

11. The operation control method of claim 5, wherein the first setup item relating to brightness of a display screen of the apparatus.

* * * * *